(12) United States Patent
Horsfall et al.

(10) Patent No.: US 12,467,118 B2
(45) Date of Patent: Nov. 11, 2025

(54) MOLTEN LEAD SCRAP SUBMERGENCE APPARATUS

(71) Applicant: PYROTEK, INC., Spokane, WA (US)

(72) Inventors: Andrew Horsfall, Aurora, OH (US); Peter Jetten, Oud-Beijerland (NL)

(73) Assignee: PYROTEK, INC., Spokane, WA (US)

( * ) Notice: Subject to any disclaimer, the term of this patent is extended or adjusted under 35 U.S.C. 154(b) by 709 days.

(21) Appl. No.: 17/783,585

(22) PCT Filed: Dec. 9, 2020

(86) PCT No.: PCT/US2020/063942
§ 371 (c)(1),
(2) Date: Jun. 8, 2022

(87) PCT Pub. No.: WO2021/119085
PCT Pub. Date: Jun. 17, 2021

(65) Prior Publication Data
US 2023/0037016 A1 Feb. 2, 2023

Related U.S. Application Data

(60) Provisional application No. 62/945,736, filed on Dec. 9, 2019.

(51) Int. Cl.
*C22B 13/00* (2006.01)
*C22B 3/00* (2006.01)
(Continued)

(52) U.S. Cl.
CPC .............. *C22B 13/045* (2013.01); *C22B 3/02* (2013.01); *H01M 10/06* (2013.01); *H01M 10/54* (2013.01)

(58) Field of Classification Search
CPC ........ C22B 13/045; C22B 3/02; H01M 10/06; H01M 10/54
See application file for complete search history.

(56) References Cited

U.S. PATENT DOCUMENTS 7,727,461 B2 6/2010 Morando
2003/0197313 A1 10/2003 Areaux et al.
(Continued)

FOREIGN PATENT DOCUMENTS

JP 2007317417 A 12/2007
JP 2017089921 A 5/2017
(Continued)

OTHER PUBLICATIONS

International Search Report for Application No. PCT/US2020/063942, Mailed Mar. 29, 2021, 5 pages.
(Continued)

*Primary Examiner* — Zulmariam Mendez
(74) *Attorney, Agent, or Firm* — Lippes Mathias LLP

(57) ABSTRACT

A system for melting lead scrap pieces. The system includes a vessel. A vortexing chamber is disposed in the vessel. The vortexing chamber includes an inlet, an outlet and an open top configured to receive lead pieces. A pump is disposed in the vessel and directs molten lead to the inlet of the vortexing chamber. A dross dam divides the vessel into a first region and a second region. The vortexing chamber is disposed in the second region and a conduit extends between the vortexing chamber outlet and the first region. A transfer pump is disposed in the second region and is configured for removal of molten lead from the vessel. The system allows dross to be skimmed from a surface of the molten lead bath in the first region.

20 Claims, 5 Drawing Sheets

(51) Int. Cl.
*C22B 3/02* (2006.01)
*H01M 10/06* (2006.01)
*H01M 10/54* (2006.01)

(56) References Cited

U.S. PATENT DOCUMENTS

| | | |
|---|---|---|
| 2013/0306687 A1 | 11/2013 | Cooper et al. |
| 2015/0069679 A1 | 3/2015 | Henderson et al. |
| 2016/0030987 A1 | 2/2016 | Riedewald |
| 2016/0053762 A1 | 2/2016 | Cooper |

FOREIGN PATENT DOCUMENTS

| | | |
|---|---|---|
| WO | 2014167139 A2 | 10/2014 |
| WO | 2018044842 A1 | 3/2018 |

OTHER PUBLICATIONS

Written Opinion for Application No. PCT/US2020/063942, Mailed Mar. 29, 2021, 5 pages.
European Search Report for PCT/US2020/063942, dated Sep. 11, 2023, 9 pages.

MOLTEN LEAD SCRAP SUBMERGENCE APPARATUS

This application claims the benefit of U.S. Provisional Application Ser. No. 62/945,736 filed Dec. 9, 2019, which is hereby incorporated by reference.

BACKGROUND

The background description includes information that may be useful in understanding the present invention. It is not an admission that any of the information provided herein is prior art or relevant to the presently claimed invention, or that any publication specifically or implicitly referenced is prior art.

The present exemplary embodiment relates to a method and system for recycling lead. It finds particular application in conjunction with melting the lead components of an acid-lead battery to achieve separation from other battery components and will be described with particular reference thereto. However, it is to be appreciated that the present exemplary embodiment is also amenable to other like applications.

Lead acid batteries (LABs) are the single largest class of batteries used today. They are essential for applications ranging from starting automobile engines, providing emergency back-up power for data centers, and powering industrial and recreational vehicles such as fork lift trucks and golf carts. Unlike any other battery type, LABs are almost 100% recycled. This feature has established lead as a leading recycled commodity. While LAB production is increasing per year globally, production of new lead from ore is becoming increasingly difficult as lead rich ore deposits are depleted. Not surprisingly, new and more efficient methods for lead recycling are urgently needed.

Recovery of lead from spent batteries is of significant economic importance, both as a source of raw materials and because of the problems with disposal of hazardous waste. For many years battery recycling plants have broken down the batteries, drained the acid, and milled the remaining materials to a small size. The crushing and milling liberated most of the paste portion from the grids and crushed the plastic components of the battery. In a series of hydrometallurgical processing steps the paste was separated from the metallic lead and plastic portions of the battery. Much of the chloride containing plastic along with other non-recyclable plastic, glass, and inorganic components of the battery were separated from the paste and metallics.

The standard method of recovering lead from spent batteries involves smelting the lead bearing portions of the battery in a reverberatory, rotary, blast, or electric furnace using standard pyrometallurgical procedures. Typically, the cells are chopped into small pieces and heated until the metal liquefies. Non-metallic substances are burned off, leaving a black slag on top that a slag arm removes.

It is also noted that scrap lead material is obtained during the manufacture of various lead inclusive products. For example, in the manufacture of lead acid batteries, lead is formed into a solid sheet from which components are cut or punched. This process yields remnants of the sheet. Such remnants are referred to herein as run-around scrap. This run-around scrap can be efficiently used as a charge material into a bath of molten lead as it is typically on-chemistry (i.e., the alloy composition of the scrap pieces matches the alloy composition of the bath).

The flat cost to recycle a ton of batteries is $1,000 to $2,000. European entities hope to achieve a cost per ton of $300. Ideally, this would include transportation, but moving and handling the goods is expected to double the overall cost. To simplify transportation, European entities are setting up smaller processing plants in strategic geographic locations. This, in part, is due to the Basel Convention that prohibits the export of complete but spent lead acid batteries. As the volume of discarded batteries increases, new technologies are being developed to make recycling profitable without the support of agencies and governments.

The present disclosure provides an improved system and method for processing chopped lead pieces and improves the efficiency of the smelting process through which clean molten lead is achieved. Additionally, this reclamation smelting process can be used for melting on-chemistry run-around scrap.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to one exemplary embodiment, a system for recycling lead scrap is provided. The system includes a vessel defining a vortexing chamber. The vortexing chamber includes an inlet, an outlet and an open top configured to receive lead pieces. A pump is disposed in the vessel and directs molten lead to the inlet of the vortexing chamber. A dross dam divides the vessel into a first region and a second region. The vortexing chamber is disposed in the second region and a conduit extends between the vortexing chamber outlet and the first region. A transfer pump is disposed in the second region and is configured for removal of molten lead from the vessel.

According to another embodiment, a system for recycling lead pieces is provided. The system includes a vessel configured to contain a bath of molten lead. The vessel is divided into a vortexing chamber, a dross chamber and a main bath region. The vortexing chamber has an inlet, an outlet and an open top configured to receive lead pieces. A first pump is disposed in the main bath region and is positioned to provide molten lead to the inlet of the vortexing chamber. A dross dam separates the dross chamber from the main bath region. A conduit extends between the vortexing chamber outlet and the dross chamber. A second pump is disposed in the main bath region for removal of molten lead from the vessel.

According to a further embodiment, a process for recycling lead is provided. The process includes providing a vessel including a bath region, a vortexing region and a dross removal region. Molten lead is introduced to the vessel. A stream of the molten lead is introduced to the vortexing region. Solid lead pieces are introduced into the molten lead in the vortexing region. A portion of the molten lead is directed from the vortexing region into the dross removal region and floating dross is removed. Clean molten lead flows from the dross removal region to the bath region and is removed from the bath region for downstream processing.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
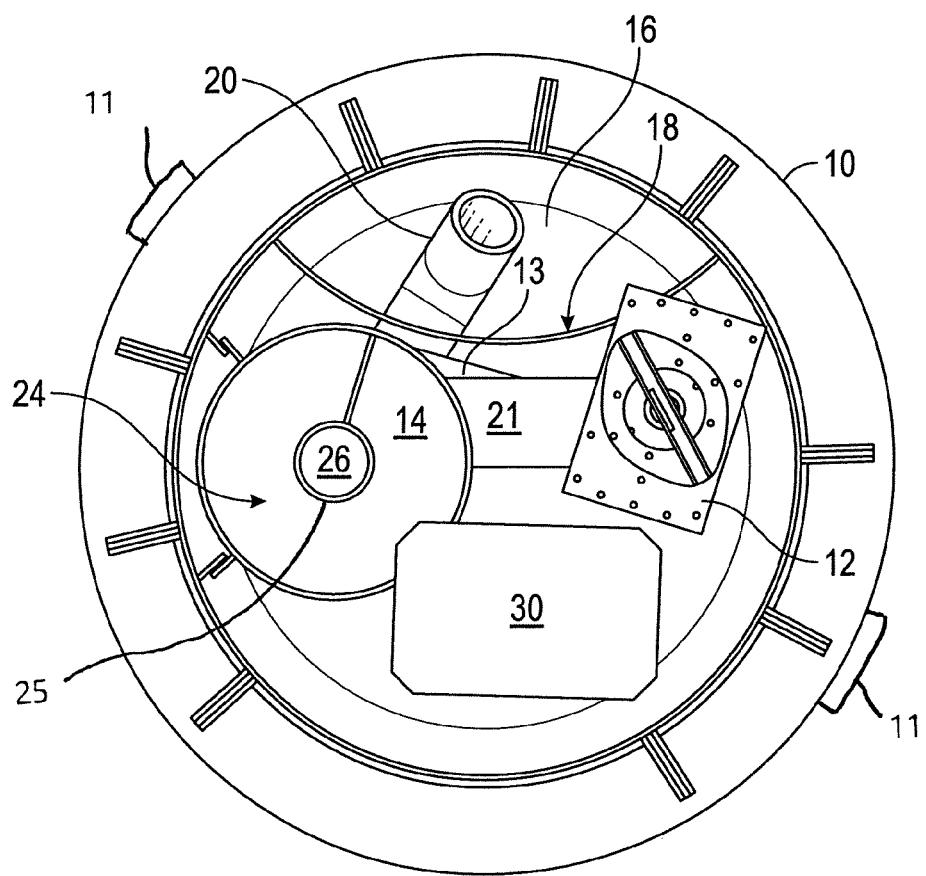
FIG. 1 is a top view of the lead scrap recycling chamber.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms about, generally and substantially are intended to encompass structural or numerical modifications which do not significantly affect the purpose of the element or number modified by such term.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

The present disclosure is directed to a system suitable for the recycle of lead scrap material of the type obtained from lead acid batteries. In the recycling of lead batteries, the lead is separated from the plastic, acid and other materials forming the finished battery by crushing chopping and separation. However, it is not feasible to avoid some comingling of constituents and some contamination of the lead components. Accordingly, the lead components are typically melted to separate the contaminants from nearly pure lead. A large portion of lead scrap pieces are thin walled because that is the form lead is used in the typical acid lead battery. Melting thin walled lead scrap pieces is difficult because rapid submerging in molten lead is severely hampered by the fact that thin walled scrap pieces float on molten metal.

The present disclosure provides a melting device into which lead scrap pieces are fed and floating dross is skimmed from the surface of the molten lead.

Figure 2:
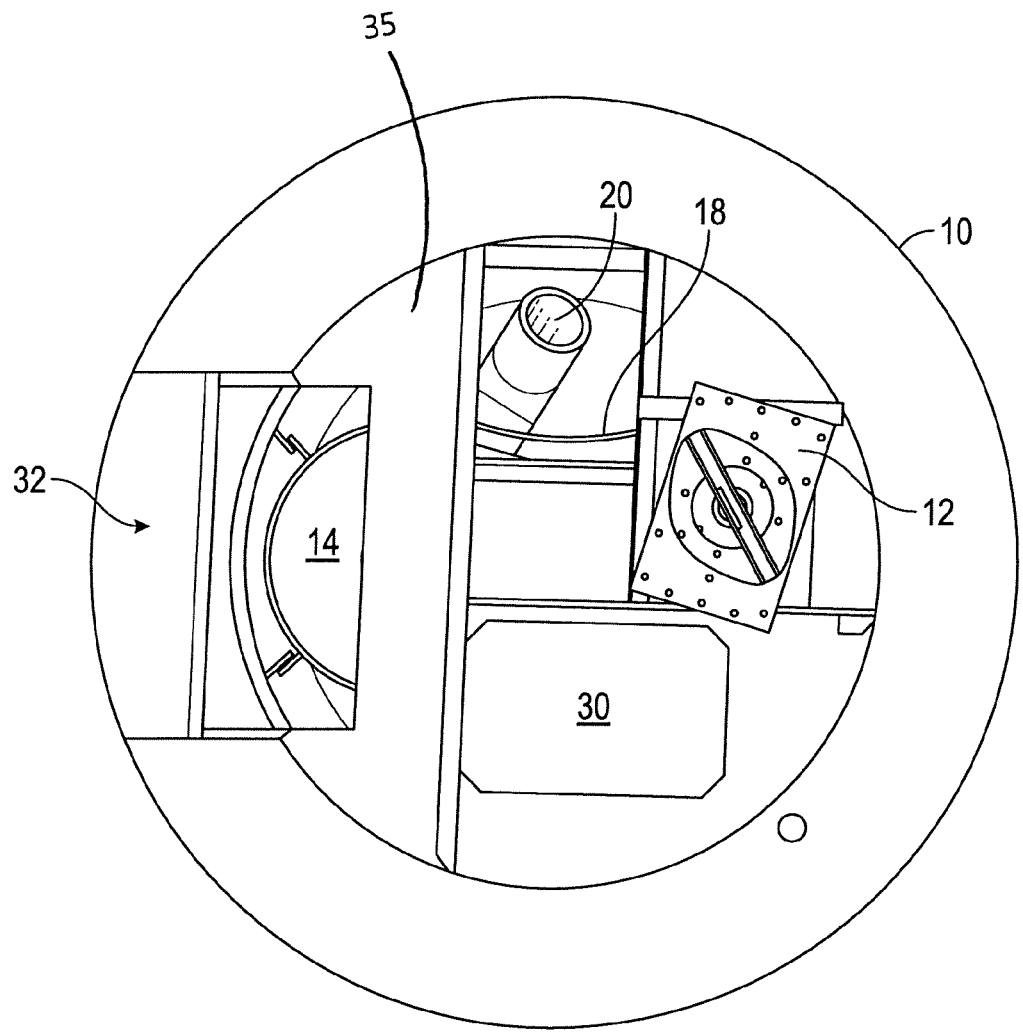
FIG. 2 is a top view of the lead scrap recycling chamber of FIG. 1 with a lid engaged.
Figure 3:
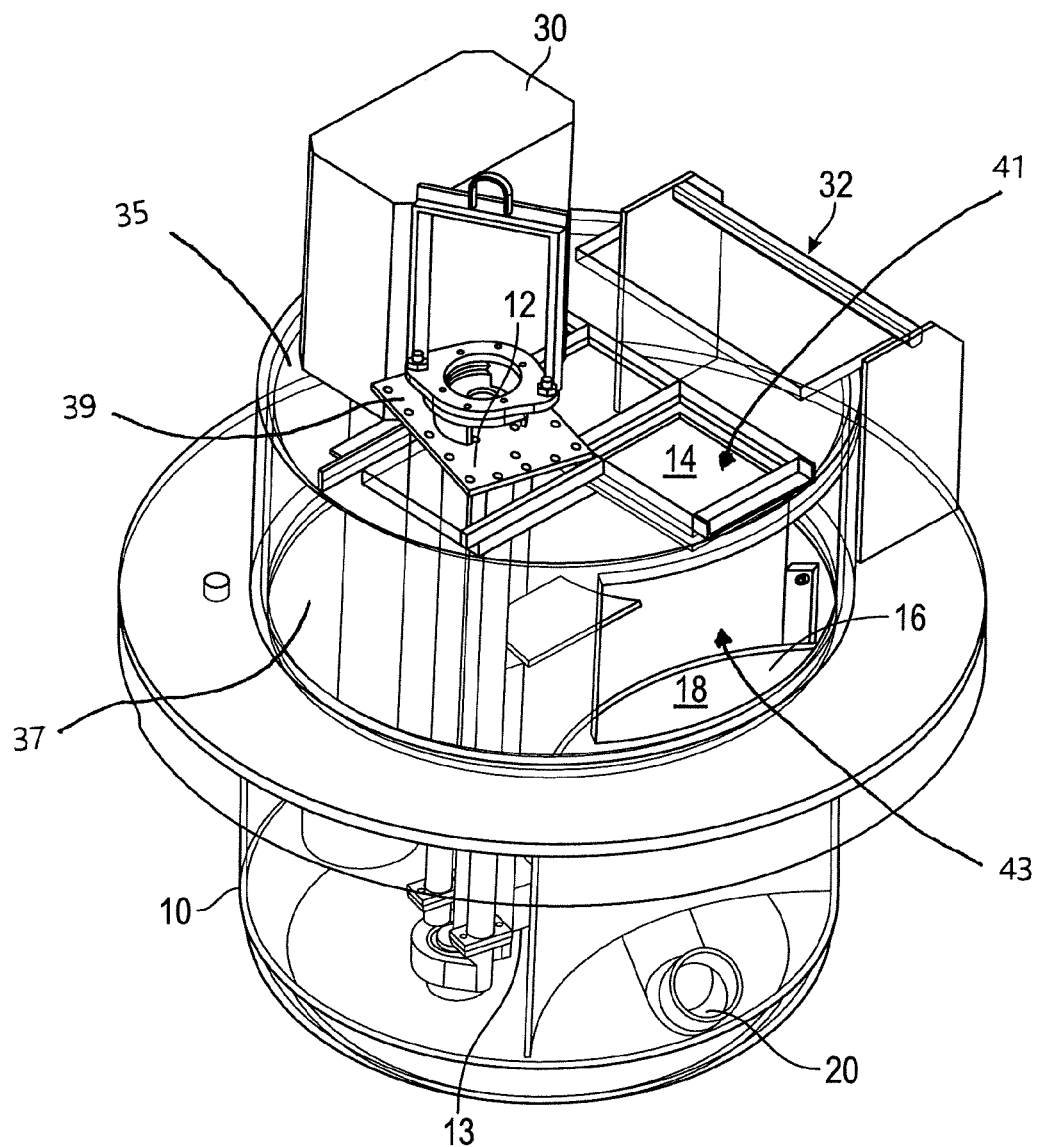
FIG. 3 is a perspective view of the lead scrap recycling chamber partially shown in phantom.

Referring now to FIGS. 1-3, a cylindrical lead recycling chamber 10 is depicted. Recycling chamber 10 functions as a furnace. Moreover, chamber 10 can be equipped with one or more electric or gas heaters 11 to allow heating of the chamber walls and melting of lead therein. A starter volume of lead can be introduced to the furnace in a solid form and melted therein or introduced in a molten state and maintained as a liquid.

The recycling chamber 10 is an open top, closed bottom vessel. The vessel can be constructed of any material resistant to molten lead and capable of withstanding a temperature up to about 350 degrees C., such as steel.

The vessel can include a mechanical circulation pump 12 that directs molten lead from the bath contained in chamber 10 via a conduit 13 into scrap submergence chamber 14 where scrap chips of the lead to be recycled are deposited onto the surface of the melt.

The circulation pump 12 can be of the type described in U.S. Pat. No. 5,470,201, the disclosure of which is herein incorporated by reference. It is noted however that the patented circulation pump can be constructed partially or completely of steel or other metal because the molten lead environment is at a significantly lower temperature than the molten aluminum environment for which the pump was designed.

The scrap submergence chamber 14 can be constructed of a metal such as steel. Molten lead from the scrap submergence chamber 14 flows into a dross well 16 through conduit 20 wherein impurities in the form of dross are skimmed from the surface.

The dross well 16 can be formed by dross dam 18 that extends between two separated points on the wall of the chamber 10. The dross dam 18 can be constructed from steel.

Typically, the section of the vessel constituting the dross well will be smaller than the section of the vessel constituting the clean molten lead bath. The dross dam 18 can extend from a top edge of the vessel 10 to at least slightly above the floor of the vessel. Moreover, a space such as 10 to 30% or 15 to 25% of the height of the chamber is provided between the vessel floor and the bottom edge of the dross dam 18.

The space has two functions, 1) it allows discharge conduit 20 to direct molten lead from the scrap submergence chamber 14 into the dross well 16 and 2) it allows "clean" molten lead which is heavier than dross to sink to the vessel floor and flow into the main bath of molten lead.

Circulation pump 12 is positioned in the molten lead bath in vessel 10 and forces molten lead into the scrap submergence chamber 14. More particularly, the rotation of an impeller draws molten lead from the bath into the pump and forces it through pipe 13 into the scrap submergence chamber 14.

Figure 4:
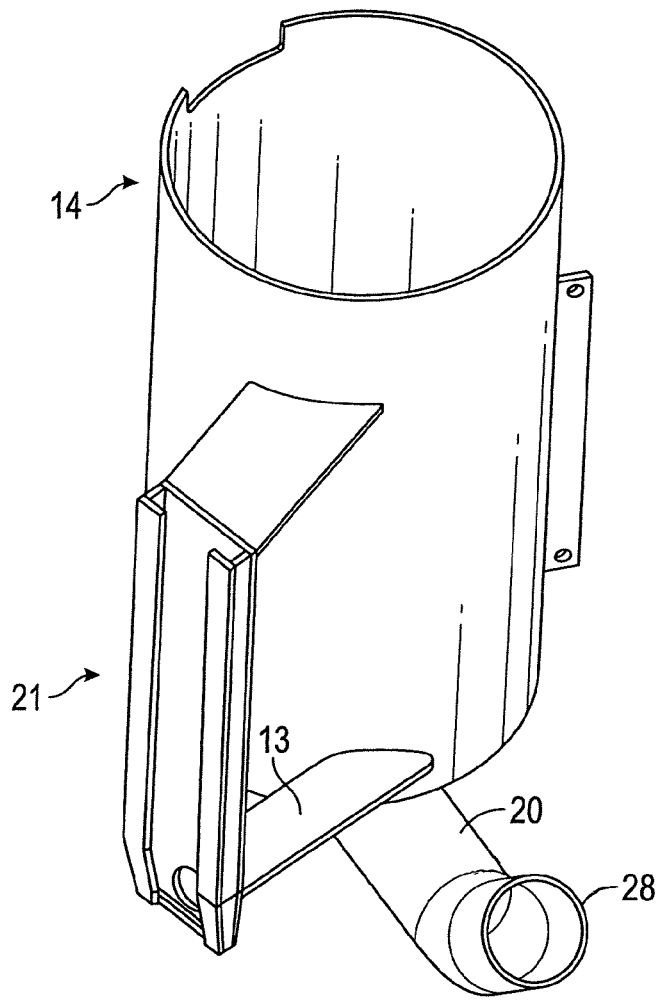
FIG. 4 is a perspective view of the vortexing chamber of the scrap recycling chamber.
Figure 5:
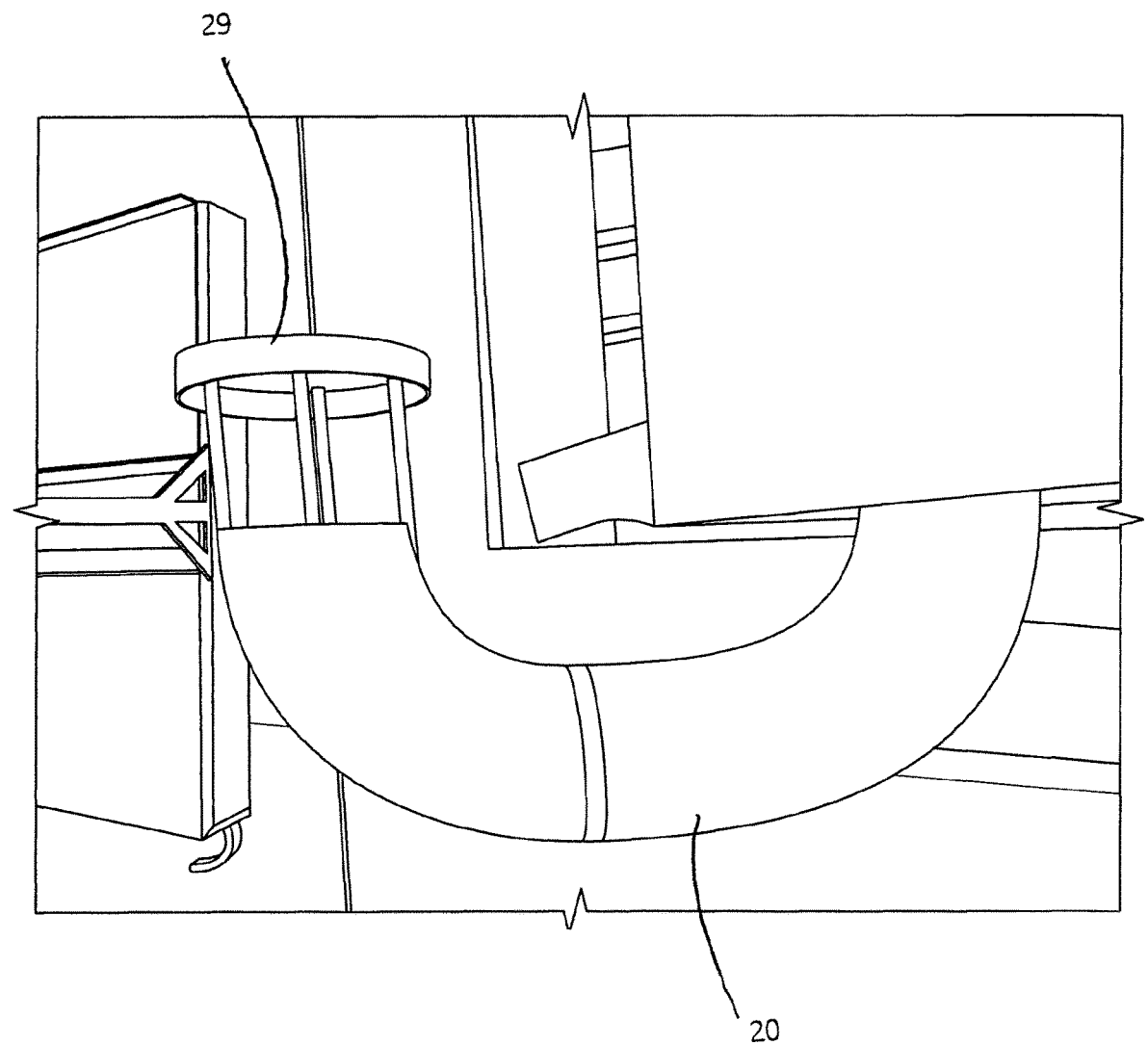
FIG. 5 is a side elevation view of the discharge conduit dispersion plate.

As shown in FIG. 4, the circulation pump 12 can be mounted upon a frame 21 that is an integral component of the scrap submergence chamber 14. Pipe 13 can also be an integral component of the frame 21 to facilitate installation/replacement of circulation pump 12 and assure proper alignment thereof. As used herein the term integral means that the components are physically connected, for example, by welding.

With continuing reference to FIGS. 1-3, a ramp 24 can be provided within scrap submergence chamber 14 such that molten metal pumped through pipe 13 travels up the ramp and spills over an inner edge and exits through outlet 26 into discharge conduit 20. A leading edge of the ramp 24 can be positioned adjacent an inlet to the scrap submergence chamber 14. The chamber inlet can be positioned in a side wall or base wall. The chamber can include an inner column 25 defining the outlet 26 in the chamber base wall. The inner column can increase in height to coincide with the increasing elevation of the ramp 24. Generally, the internal form of the chamber can be described as a bottom or low side wall inlet and a bottom outlet with a ramp formed between an inner column and the side wall. The ramp may extend from 0 to 180°, or 270°, or 360° of the circumference of the chamber.

The exit 28 of discharge conduit 20 can include a dispersion plate 29 to direct flow radially. Moreover, the dispersion plate can be spaced from the conduit exit and arranged perpendicular to the predominant direction of molten lead flow as it exits discharge conduit 20. The dispersion plate can help minimize surface turbulence otherwise caused by flow from the discharge conduit.

A transfer pump 30 is provided in the main bath of the vessel 10. The transfer pump can be of a type described in U.S. Pat. Nos. 4,940,384; 5,947,705; 9,506,346 or 10,843,258, the disclosures of which are herein incorporated by reference. Transfer pump 30 is used to remove the clean molten lead from the vessel for use as commonly performed in the industry. As with the other components of the system, the transfer pump can be constructed of steel, refractory, or combinations thereof.

As is recognized by those of ordinary skill in the art, lead chips being recycled are deposited onto the surface of the melt in scrap submergence chamber 14. A scrap feed chute 32 may be provided as an element of the system to facilitate introduction of lead scrap pieces through an opening in a lid 35 and onto the melt in the scrap submergence chamber. The vortex of molten lead within the vortexing chamber forms a folding flow that works efficiently in pulling the lead scrap pieces below the surface of the molten lead bath where melting occurs quickly.

Lid 35 provides safety and retains heat in the molten lead bath. The lid 35 can include a sidewall portion 37 to provide suitable spacing above the vessel 10 to accommodate the height of the pump components.

Lid 35 can work in combination with elements of the other system components (e.g. motor mount 39 of circulation pump 12) to at least substantially close the system to the atmosphere with respect to the molten lead bath contained therein.

An opening 41 can be provided above the scrap submergence chamber 14 to allow lead chips to be feed therein. An opening 43 can be provided in the sidewall 37 to allow access to the dross well 16 to allow dross to be skimmed from the surface thereof.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. A system for recycling lead pieces comprising a vessel defining a vortexing chamber, said vortexing chamber includes an inlet, an outlet and an open top configured to receive lead pieces, a circulation pump is disposed in said vessel for providing molten lead to the inlet of the vortexing chamber, a dross dam divides the vessel into a first region and a second region, said dross dam extending from above a surface of a molten lead bath within the vessel to above a floor of the vessel such that a space exists between the floor of the vessel and a lower edge of the dross dam allowing molten lead to flow from the first region to the second region, a conduit extends between the vortexing chamber outlet and the first region, a transfer pump is disposed in the second region and is configured for removal of molten lead from the vessel.

2. The system of claim 1 wherein said vessel, said dross dam and said vortexing chamber are comprised of steel.

3. The system of claim 1 wherein said conduit further includes a dispersion plate.

4. The system of claim 1 further comprising a lid overlying the vessel, said lid including an opening overlying the vortexing chamber and a structure for suspending the transfer pump.

5. The system of claim 1 wherein said vortexing chamber includes a radial ramp.

6. The system of claim 1 wherein the vortexting chamber includes a frame member receiving the circulation pump.

7. The system of claim 6 wherein the frame member includes a pipe providing fluid communicating between an exit of the circulation pump and the inlet of the vortexing chamber.

8. A system for recycling lead pieces comprising a vessel configured to contain a bath of molten lead, the vessel being divided into a vortexing chamber, a dross chamber and a main bath region, the vortexing chamber including an inlet, an outlet and an open top configured to receive lead pieces, a first pump disposed in the main bath region and positioned to provide molten lead to the inlet of the vortexing chamber, a dross dam separating the dross chamber from the main bath region, said dross dam extending from above a surface of a molten lead bath within the vessel to above a bottom of the vessel allowing molten lead to flow under the dross dam from the dross chamber into the main bath region, a conduit extending between the vortexing chamber outlet and the dross chamber, and a second pump disposed in the main bath region for removal of molten lead from the vessel.

9. The system of claim 8 wherein the vessel is cylindrical.

10. The system of claim 8 wherein the vessel includes at least one heater.

11. The system of claim 8 wherein a volume of the dross chamber is less than a volume of the main bath region.

12. The system of claim 8 wherein the conduit includes a dispersion plate at an exit end within the dross chamber.

13. The system of claim 8 wherein a pipe connects the first pump and the vortexing chamber and wherein the pipe intersects the vortexing chamber at a tangent or angled secant.

14. The system of claim 8 further including a lid having an opening facilitating access to the vortexing chamber and an opening facilitating access to the dross chamber.

15. A process for recycling lead comprising providing a vessel including a bath region, a vortexing region and a dross removal region; introducing molten lead to the vessel; introducing a stream of the molten lead to the vortexing region; introducing solid lead pieces into the molten lead in the vortexing region; directing a portion of the molten lead from the vortexing region into the dross removal region via a conduit and removing floating dross; a dam separating the dross removal region from the bath region and wherein molten lead flows through the conduit past the dross dam into the dross removal region and returns under the dam allowing molten lead to flow from the dross removal region to the bath region, and removing molten lead from the bath region for downstream processing.

16. The process of claim 15 wherein the lead pieces are derived from a recycled lead acid battery.

17. The process of claim 15 wherein the lead pieces are derived from scrap remnants of lead component manufacture.

18. The process of claim 15 wherein the vessel is maintained at between 327.5° C. and 600° C.

19. The system of claim 1 wherein the conduit passes from a first side of the dross dam to a second side.

20. The system of claim 8 wherein the conduit passes from a first side of the dross dam to a second side.

* * * * *